United States Patent
Diener et al.

[11] 3,731,564
[45] May 8, 1973

[54] MACHINE TOOL

[75] Inventors: Robert E. Diener, Shaker Heights; Warren E. Dowling, Cleveland, both of Ohio

[73] Assignee: The Warner and Swasey Company, Cleveland, Ohio

[22] Filed: Dec. 21, 1970

[21] Appl. No.: 100,248

[52] U.S. Cl. ......................................82/31, 408/13
[51] Int. Cl. ...............................................B23b 23/00
[58] Field of Search ...........................82/31; 408/13

[56] References Cited

UNITED STATES PATENTS

| | | | |
|---|---|---|---|
| 1,921,502 | 8/1933 | Brill | 82/31 |
| 2,586,127 | 2/1952 | Von Zelewsky | 82/31 |
| 3,581,611 | 6/1971 | Lentz | 82/31 |

FOREIGN PATENTS OR APPLICATIONS

| | | | |
|---|---|---|---|
| 241,907 | 3/1969 | U.S.S.R. | 82/31 |

*Primary Examiner*—Leonidas Vlachos
*Attorney*—Yount and Tarolli

[57] ABSTRACT

An improved machine tool has a tailstock which is moved along a bed by a drive assembly which includes a screw driven by an electrical torque type motor. A relatively large setting or jamming force is used to initially lock a workpiece in the machine tool. During operation of the machine tool, the motor is maintained in a stalled condition in which it produces a holding torque which urges the tailstock against the workpiece to thereby clamp the workpiece in the machine tool. The torque which the motor produces in the stalled condition is selectively adjustable by varying the voltage applied to the motor.

14 Claims, 4 Drawing Figures

PATENTED MAY 8 1973    3,731,564

INVENTORS
ROBERT E. DIENER
WARREN E. DOWLING
BY Yount and Tarolli
ATTORNEYS

MACHINE TOOL

This invention relates to a machine tool having a power operated tailstock.

Lathes commonly include a tailstock which supports a workpiece as is rotated by a headstock. In order to accommodate workpieces of different sizes, the position of the tailstock is adjusted relative to the headstock. In certain lathes, such as the one disclosed in U. S. Pat. No. 2,473,093, a hydraulic cylinder is utilized to move the tailstock relative to the bed of the lathe. Once the tailstock has been moved to the desired position along the bed of the lathe, the tailstock is locked in place and a handwheel is operated to move a lathe center into supporting engagement with the workpiece.

Considerable care must be exercised in operating the handwheel to tighten the lathe center properly against the workpiece. First the handwheel must be operated to press the lathe center against the workpiece with a relatively large force to seat or set the workpiece. Then the lathe center is backed off to reduce the operating load on the headstock and tailstock and to enable the workpiece to rotate freely. While the workpiece must rotate freely, if it is too loose, the workpiece will "chatter" during cutting. Heretofore, it has been necessary to check the tightness of the lathe center during cutting. This is because the tightness of the center may be increased due to heating and thermal expansion of the workpiece as it is cut.

Accordingly, it is an object of this invention to provide a new and improved machine tool having a tailstock which is urged toward a workpiece by a motor to apply a predetermined force to the workpiece during operation of the machine tool.

Another object of this invention is to provide a new and improved machine tool in accordance with the next preceding object and wherein a control means is provided for maintaining the motor in a stalled condition in which the motor urges the tailstock against the workpiece with a predetermined force during operation of the machine tool.

Another object of this invention is to provide a new and improved machine tool having an electrical torque type motor which is used to drive a tailstock, the stall torque of the motor being used to clamp the workpiece in the machine tool.

Another object of this invention is to provide a new and improved machine tool wherein a drive assembly urges a tailstock into engagement with a workpiece with a relatively high force to set the tailstock in secure engagement with the workpiece, the drive assembly being operable to urge the tailstock against the workpiece with a somewhat smaller force during operation of the machine tool to thereby maintain tight engagement between the workpiece and the tailstock.

These and other objects and features of the present invention will become more apparent upon a consideration of the following description taken in connection with the accompanying drawings wherein.

Figure 1:
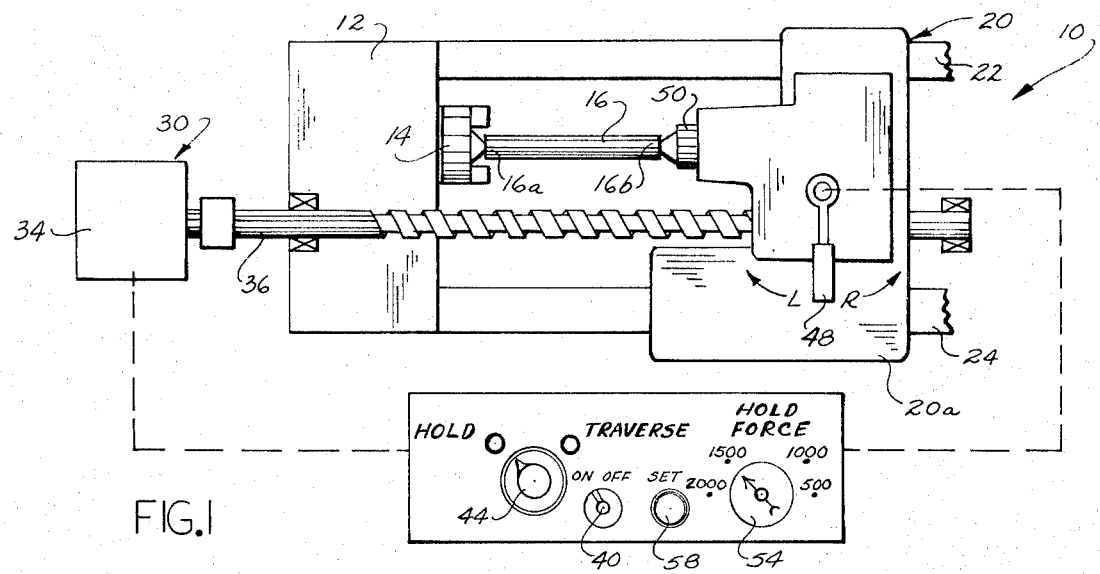
FIG. 1 is a schematic illustration of a machine tool constructed in accordance with the present invention and having a tailstock which is driven by an electrical torque type motor.

A machine tool 10 constructed in accordance with the present invention is illustrated schematically in FIG. 1. The machine tool 10 includes a headstock 12 having a spindle 14 for rotating a workpiece 16. A tailstock 20 supports an end of the workpiece 16 which is opposite from the spindle 14. The tailstock 20 includes a non-rotatable base 20a which is movable toward and away from the head stock 12 along bedways 22 and 24 to vary the distance between the headstock and tailstock to accommodate workpieces of different lengths. In accordance with well-known machining practices, a carriage or cross-slide (not shown) is provided in association with the bedways 22 and 24 to support a tool for cutting the workpiece 16. Since the general method of operation of machine tools similar to the machine tool 10 are understood by those skilled in the art, the known operating features of the machine tool 10 will not be further described herein order to avoid prolixity of description.

In accordance with the present invention, the tailstock 20 is driven along the bedways 22 and 24 by a drive assembly 30 which is operable to urge the tailstock toward the headstock 12 to apply a predetermined holding or operating force to the workpiece 16 during operation of the machine tool 10. The drive assembly 30 includes an electrical torque type motor 34 which is energized and maintained in a stalled condition to apply the predetermined holding force to the workpiece 16 during operation of the machine tool 10. The magnitude of the holding force is adjusted by adjusting the voltage applied to the motor 34. Although different electrical torque motors could be utilized, in one specific embodiment of the invention the electric motor 34 was a permanent magnet DC torque motor manufactured by the Peerless Division of the H.K. Porter Co. and designated as a Peerless DPM 56P motor with blower and brake. Of course, other motors could be utilized if desired in place of this specific motor.

Torque transmitted by the motor 34 to a drive screw 36 can be varied to adjust the speed at which tailstock 30 is moved along the bedways 22 and 24 by rotation of the drive screw and to adjust the pressure which the tailstock applies against the workpiece 16 during operation of the machine tool 10. Thus, the motor 34 is operable to rotate the drive screw 36 in one direction to move the tailstock 20 toward the headstock 12 and is operable to rotate the drive screw in the opposite direction to move the tailstock 20 away from the headstock. As the tailstock 20 approaches the headstock 12 and workpiece 16, the speed of movement of the tailstock can be reduced to facilitate positioning the workpiece. In addition, the motor 34 is operable to provide a relatively high torque output to seat or set the workpiece in the machine tool 10. Once this has been accomplished, the torque output of the motor 34 is reduced so that the tailstock 20 is pressed against the workpiece 16 with a relatively low holding or operating force. This relatively low holding or operating force enables the workpiece 16 to be easily rotated by the headstock 12.

When the workpiece 16 is to be positioned in the machine tool 10, an end portion 16a of the workpiece is engaged by the spindle 14. A control switch 40 on a control panel 42 is moved to the on position and a control switch 44 is turned to the traverse position. A control lever 48 on the tailstock 20 is then moved toward the left (as viewed in FIG. 1) to effect operation of the motor 34 to rotate the drive screw 36 to move the tailstock 20 toward the head stock 12 at a relatively high rate of speed.

As a lathe center 50 on the tailstock 20 approaches an end 16b of the workpiece 16, the output torque of the motor 34 is reduced by moving the control switch 44 to the hold position so that the drive screw 36 is driven at a relatively low speed. As the tailstock continues toward the workpiece at a reduced speed, the lathe center 50 on the tail stock engages the end 16b of the workpiece. When the tailstock has applied a predetermined force to the workpiece 16, the electric motor 34 stalls and the tailstock 20 continues to press the lathe center 50 against the workpiece 16 with a force determined by the output torque of the stalled torque motor 34. The output torque of the stalled motor 34 can be adjusted by operating a control switch 54 to vary the voltage applied to the stalled motor.

Once the lathe center 50 on the tailstock 20 has moved into engagement with the workpiece 16, it is necessary to press the lathe center 50 against the workpiece with a relatively high force in order to effect a setting or jamming of drive lugs on the head stock 12 into secure engagement with the workpiece 16. To accomplish this, a set button 58 on the control panel 42 is depressed to effect an increase in the voltage applied to the now stalled electric motor 34. Of course, the increase in voltage applied to the motor 34 increases the output torque of the motor. This relatively large jamming or setting torque results in the tailstock 20 being pressed against workpiece 16 with a relatively large force to firmly seat the workpiece in the machine tool 10.

Once the workpiece 16 has been firmly seated, the set button 58 on the control panel 42 is released and the output torque of the motor 34 is reduced. However, the motor continues to be energized in the stalled condition to apply a predetermined holding or operating torque to the screw shaft 36. This holding torque results in the tailstock 20 being pressed against the workpiece 16 with a predetermined operating or holding force during operation of the machine tool 10. While this holding force is somewhat less than the setting or jamming force applied against the workpiece 16, the holding force maintains the lathe center 50 in tight engagement with the workpiece 16 so that the workpiece is clamped between the head stock 12 and tailstock 20 and does not vibrate excessively or "chatter" as it is cut. Of course, the holding force which the tailstock 20 must apply against the workpiece 16 to hold the lathe center 50 in tight engagement with the workpiece will vary with the different machine operations and different materials. Therefore, the holding torque applied by the motor 34 to the screw shaft 16 can be varied to suit the operating conditions under which the machine tool 10 is being used by merely setting the control switch 54 to a position corresponding to the desired holding force to be applied against the workpiece.

Since the motor 34 is stalled when the tailstock 20 is applying the operating or holding force to the workpiece 16, the holding force applied by the tailstock 20 against the workpiece 16 can be readily adjusted by varying the output torque of the stalled electric motor 34. A control circuit 62 (FIG. 2) for varying the output torque of the electric motor 34 includes a transformer 64 having a plurality of outputs to which the switch 54 can be set to apply a corresponding voltage to the stalled motor 34. Of course, the output torque of the stalled motor 34 will vary directly with the voltage which is applied to it. Thus, in order to increase the holding or operating force applied against the workpiece 16 by the tailstock 20, the control switch 54 is moved to increase the voltage applied to the stalled motor 34 to thereby increase the torque output of the motor 34 to the drive screw 36. Similarly, the holding or operating force applied against the workpiece 16 by the tailstock 20 is decreased by decreasing the voltage applied to the motor 34 to thereby decrease the output torque applied by the motor to the drive screw 36. Of course, if the voltage applied to the motor 34 remains substantially constant, that is the control switch 54 is left in a selected position, the force applied by the tailstock 20 to the workpiece 16 will also remain substantially constant.

The transformer 64 includes a plurality of output terminals 70 and 72 which are engaged by contacts 74 and 76 of the control switch 54. Although the contacts 74 and 76 are electrically insulated from each other, they are mechanically interconnected so that upon actuation of the control switch 54 the contact 74 is moved into engagement with one of the output terminals 70 of the transformer 64 and the contact 76 is moved into engagement with a corresponding one of the terminals 72. Since the force applied by the tailstock 20 varies in direct proportion to changes in the voltage applied to the motor 34, the output terminals 70 and 72 of the transformer 64 may be designated with numerals indicating the force applied by the tailstock 20 against the workpiece 16 when these terminals are engaged by the movable contacts 74 and 76 of the control switch 54. Thus in the illustrated embodiment of the invention, when the contacts 74 and 76 of the control switch 54 are in engagement with the terminals 80 and 82 of the transformer 64, a 500 pound force is applied by the tailstock 20 against the workpiece 16. Similarly, when the control switch 54 is operated to move the contacts 74 and 76 into engagement with the terminals 86 and 88 of the transformer 64, a 2,000 pound force is applied against the workpiece 16 by the tailstock 20. Of course, the force applied by the tailstock 20 against the workpiece 16 will vary in direct proportion to variations in voltage applied to the motor 34 as the control switch 54 is actuated to move the contacts 74 and 76 between the relatively low voltage associated with the terminals 80 and 82 and the relatively high voltage associated with the terminals 86 and 88. It should be understood that in different machine tools the specific forces set forth above in connection with the transformer 64 may be different depending upon the particular machining operations which it is contemplated that the machine tools will be utilized to perform.

A three phase rectifier 92 is connected with the contacts 74 and 76 of the control switch 54 by leads 94 and 96 and with the center terminal of the transformer 64 by a lead 98. The three phase rectifier 92 rectifies alternating current from the transformer 64 to provide direct current which is conducted by leads 100 and 102 through a direction switching network 104 to the motor 34. The direction switching network 104 includes a plurality of switch contacts which are closed by operation of the control lever 48 (see FIG. 1) to control the direction of operation of the motor 34. Thus, when contacts 108TL and 110TL are closed in response to leftward movement (as viewed in FIG. 1) of the control lever 48, the motor 34 is energized to drive the tailstock 20 toward the left as viewed in FIG. 1. Similarly, when contacts 112TR and 114TR are closed in response to rightward movement (as viewed in FIG. 1) of the control lever 48, the tailstock 20 is moved toward the right along the bedways 22 and 24.

When the set button 58 on the control panel 42 is actuated, a relatively large torque is applied by the motor 34 to the drive screw 36 to urge the tailstock 20 toward the workpiece 16 with a relatively large force so as to ring the lathe center 50 on the tailstock 20 into firm engagement with the workpiece 16. In order to enable the motor 34 to apply this relatively high torque to the drive screw 36, contacts 116TS and 118TS are closed to connect output terminals 122 and 124 of the transformer 64 to the rectifier 92 so that a relatively large voltage is applied by the rectifier to the motor 34. Of course, this relatively large voltage causes the stalled motor 34 to apply a relatively large torque to the drive screw 36. This causes the tailstock to press toward the left and apply a relatively large setting or jamming force against the workpiece 16, in the specific embodiment of the invention illustrated in FIG. 2 this jamming force is four thousand pounds. Contemporaneously with the closing of the contacts 116TS and 118TS, interlock contacts 130TS and 132TS are opened to prevent shorting out between the terminals 122 and 124 of the transformer 64 and the terminals engaged by the movable contacts 74 and 76 of the control switch 54.

A main control circuit 138 (FIG. 3) is provided to control the operation of the motor control circuit 62. The main control circuit 138 includes a hold sub-circuit 140 which is activated to maintain a holding or operating force, selected by operation of the control switch 54, on the workpiece 16 during operation of the machine tool 10. A traverse direction sub-circuit 142 controls the direction of movement of the tailstock 20. Finally, a sub-circuit 144 controls the application of the setting or jamming force to the workpiece 16 by the tailstock 20.

When the workpiece 16 is to be initially positioned in the machine tools 10, the control switch 40 (FIG. 1) on the control panel 42 is actuated to the on position to close switch contacts 150 and 152 (FIG. 3) to activate the main control circuit 138. Assuming that the tailstock 20 is spaced a substantial distance from the end 16b of the workpiece 16, the control switch 44 is moved to the traverse position. It should be noted that until the control lever 48 on the tailstock 20 is moved, the left and right switch contacts 156 and 158 associated with the control lever 48 are in the open condition so that the 162TL relay and 164TR relay are both de-energized and the direction switching network 104 is in the open condition. This prevents the motor 34 from being energized until the control lever 48 is moved in the direction in which the tailstock 20 is to move relative to the bedways 22 and 24.

Upon movement of the control lever 48 toward the left (as viewed in FIG. 1) the contacts 156 are closed to effect leftward movement of the tailstock 20. Thus, closing the contacts 156 energizes the 162TL relay through the normally closed contacts 168TR of the 164TR relay, the now closed traversed contacts 170 of the control switch 44, and interlock contacts 172H which are closed in response to an opening of hold contacts 174 upon operation of the control switch 44 to the traverse position. Energization of the 162TL relay closes its normally open contacts 108TL and 110TL in the direction switching network 104 to effect operation of the motor 34 in a direction to drive the tailstock 20 toward the left (as viewed in FIG. 1).

Figure 2:
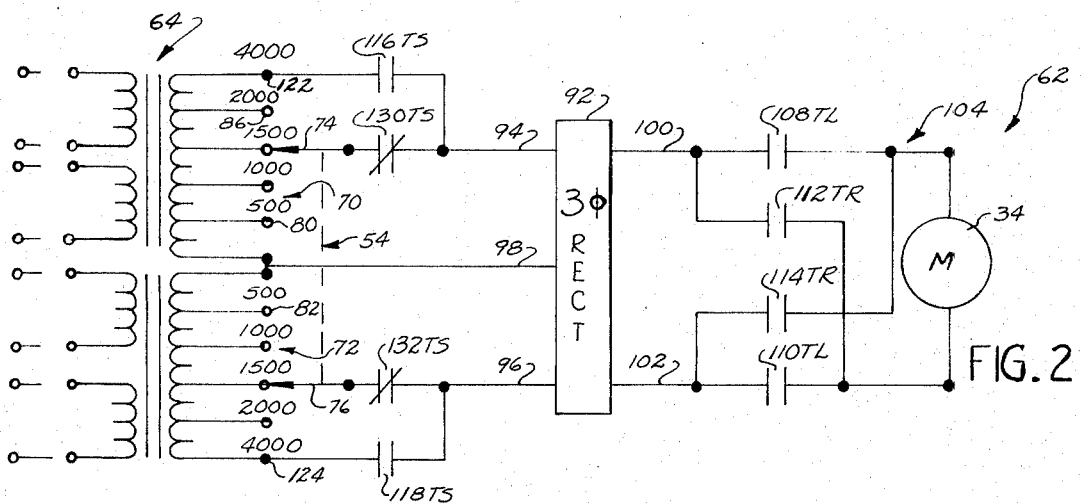
FIG. 2 is a schematic illustration of a circuit for energizing the motor with voltages of different magnitudes to vary the output torque of the motor in a stalled condition.

Since the tailstock is to move through a relatively large distance, the motor 34 is energized with the relatively high setting or jamming voltage associated with the output terminals 122 and 124 of the transformer 64 (FIG. 2). This is accomplished by energizing the 180TS relay (FIG. 3) through a circuit including the contacts 182TL of the now energized 152TL relay and the now closed traverse contacts 184 of the control switch 44. Upon energization of the 180TS relay, contacts 116TS and 118TS in the motor control circuit 62 (FIG. 2) are closed to connect the high voltage output terminals 122 and 124 with the rectifier 92. This results in the tailstock 20 being driven at a high speed toward the left.

When the tailstock 20 is relatively close to the workpiece 16, the control lever 48 is returned to its neutral or unoperated position to stop the motor 34. Thus, when the control lever 48 moves to its neutral position, the contacts 156 and 158 are open. This results in the 162TL relay being de-energized with a resulting opening of the direction switching network 104 and de-energization of the 180TS relay to disconnect the transformer terminals 122 and 124 from the rectifier 92. Of course, this de-energizes the motor 34.

Figure 3:
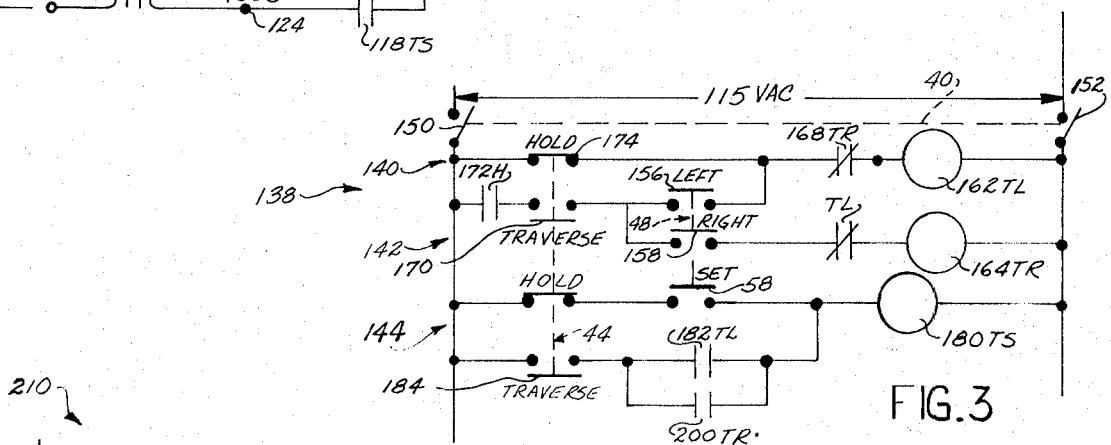
FIG. 3 is a schematic illustration of circuitry for controlling the operation of the motor.

The lathe center 50 on the tailstock 20 is now moved toward the left at a relatively slow speed to facilitate alignment of the lathe center with the workpiece 16. Accordingly, the control switch 44 is operated from the traverse position to the hold position (see FIG. 1). This results in the traverse contacts 170 and 184 of the control switch 44 being opened and hold contacts 174 and 188 of the control switch 44 being closed (as shown in FIG. 3). When the control switch 54 is in the hold position, the motor 34 is energized to apply a torque to the drive screw 36 to urge the tailstock 20 toward the left. Thus, upon the closing of the hold contacts 174, the 162TL relay is energized with a closing of its contacts 108TL and 110TL in the direction switching network 104 (FIG. 2). Current is then conducted from the movable contacts 74 and 76 of the control switch 54 to the rectifier 92 so that DC current of a voltage proportional to the position of the movable contacts 74 and 76 is applied through the direction switching network 104 to the motor 34 to drive the tailstock 20 toward the left at a relatively low speed.

Once the lathe center 50 has been brought into engagement with the end 16b of the workpiece 16, leftward movement of the tailstock is blocked by the workpiece and the motor 34 will stall. When it stalls, the motor 34 is maintained energized so that it applied torque to the drive shaft 36 which is proportional to the setting of the movable contacts 74 and 76 of the control switch 54. This torque is relatively low and causes the tailstock to be urged toward the left in such a manner as to apply a relatively low force against the workpiece 16.

The lathe center 50 must now be pressed against the workpiece 16 with a relatively large force in order to securely set or seat the workpiece between the headstock 12 and tailstock 20 of the machine tool 10. The application of a relatively large setting or jamming force against the workpiece 16 by the tailstock 20 is accomplished by depressing the set button 58 (FIG. 3) to energize the 180TS relay. Energization of the 180TS relay closes its normally open contacts 116TS and 118TS and opens its normally closed contacts 130TS and 132TS to apply a relatively high voltage to the rectifier 92 and the motor 34. Of course, when the voltage applied to the motor 34 increases, the stall torque of a motor 34 increases to urge the tailstock 20 toward the left with a relatively large setting or jamming force. This will result in drive lugs (not shown) on the headstock 12 being pressed into secure engagement with the left-hand end 16b of the workpiece 16.

Once the lathe center 50 has been set relative to the workpiece 16, the set button 58 is released and the 180TS relay de-energized to open the contacts 116TS and 118TS and close the contacts 130TS and 132TS so that a holding voltage proportional to the setting of the movable contacts 74 and 76 of the control switch 54 is applied to the motor 34. This results in the motor 34 being maintained in an energized condition to apply a relatively low holding or operating torque to the drive shaft 36 to urge the tailstock toward the left with a relatively low force during operation of the machine tool 10. Since the tailstock 20 is urged toward the left with a relatively low force, the operating loads on the headstock 12 and tailstock 20 are reduced and the workpiece 16 can be readily rotated by the headstock 12. Of course, the leftward force applied by the tailstock 20 against the workpiece 16 will remain substantially constant while a machining operation is performed on the workpiece 16.

When the machining operation on the workpiece 16 has been completed, the tailstock 20 is moved toward the right (as viewed in FIG. 1) away from the workpiece 16 so that it can be removed from the machine tool. To accomplish this, the control switch 44 is moved to the traverse position and the control lever 48 is moved toward the right from its neutral position. When the control switch 44 is operated to the traverse position, the 162TL relay is de-energized with an opening of the direction control network 104 (see FIG. 2) so that the motor 34 is deenergized and the holding or operating force is no longer applied to the workpiece 16. The control lever 48 on the tailstock 20 is then moved toward the right to close the switch contacts 158 with resulting energization of the 164TR relay. Energization of the 164TR relay closes its normally open contacts 112TR and 114TR in the direction switching network 104 so that current from the rectifier 92 energizes the motor to drive the tailstock 20 toward the right as viewed in FIG. 1. It should be noted that when the control switch 44 is operated to the traverse position, the switch contacts 184 were closed and the 180TS relay energized by a circuit including the contacts 200TR of the now energized 164TR relay. As was previously explained, energization of the 180TS relay closes its contacts 116TS and 118TS to connect a relatively high voltage to the rectifier 92 so that the motor 34 is driven at a relatively high speed. This results in the tailstock 20 being moved quickly away from the workpiece 16 so that it can be readily removed from the machine tool 10.

Figure 4:
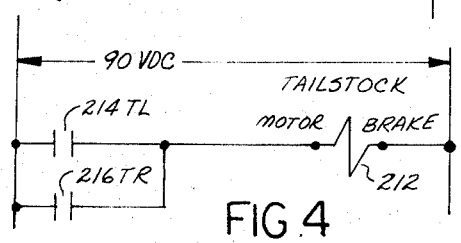
FIG. 4 is a schematic illustration of a circuit for operating a brake associated with the motor for driving the tailstock.

A brake (not shown) is advantageously associated with the motor 34 to hold the workpiece in case of power failure. The brake is of the "deadman" type which is engaged to hold the tailstock 20 unless a control solenoid 212 (FIG. 4) is energized. The control solenoid 212 is energized whenever the 162TS or 164TL relays are energized with a resulting closing of either the 214TL contacts or 216TR contacts.

In view of the foregoing description, it can be seen that the machine tool 10 includes a tailstock 20 which is moved along bedways 22 and 24 when a drive screw 36 is rotated by an electrical torque type motor 34. The torque transmitted from the motor 34 to the drive screw 36 can be varied by operating a control switch 54 to conduct voltages of different magnitudes from the transformer 64 to the rectifier 92 which applies a proportional DC voltage to the motor 34. This enables a relatively large setting or jamming force to be used to lock the workpiece 16 onto driving lugs (not shown) on the headstock upon actuation of a set switch 58. During operation of the machine tool 10, the motor 34 is maintained in a stalled condition in which the motor is ineffective to rotate the drive screw 36 and move the tailstock 20 along the bedways 22 and 24. However, the stalled motor 34 is effective to apply a holding torque to the screw 36 to urge or press the tailstock 34 against the workpiece 16 with a holding force as the workpiece is machined. The torque which the motor 34 produces in the stalled condition and the holding force applied to the workpiece are adjusted by moving the contacts 74 and 76 of the control switch 54 to engage different output terminals of the transformer 64 to vary the voltage applied to the motor.

Having described a specific preferred embodiment of the invention, the following is claimed:

1. A machine tool comprising a bed, headstock means for engaging and rotating a workpiece, tailstock means movable along said bed into engagement with the workpiece, motor means for moving said tailstock means along said bed into engagement with the workpiece, said motor means having a stalled condition in which said motor means is ineffective to move said tailstock means relative to said bed and in which said motor means is effective to urge said tailstock means toward said headstock means to apply a predetermined force to the workpiece, said motor means including an electric motor, and control means for effecting operation of said motor means in the stalled condition during operation of said machine tool to maintain a predetermined force on workpiece urging the workpiece toward said headstock means, said control means being operable to maintain said electric motor energized in a stall condition during operation of the machine tool so that the predetermined force applied to the workpiece by said tailstock means is a function of the torque output of the electric motor in a stall condition.

2. A machine tool as set forth in claim 1 wherein said control means includes means for varying the torque output of said electric motor in a stall condition to thereby vary the predetermined force applied by said tailstock means to the workpiece.

3. A machine tool as set forth in claim 1 wherein said control means includes means for varying the predetermined force applied to the workpiece between a relatively high setting force to provide for secure engagement of the workpiece by said tailstock means and a relatively low holding force to reduce the operating load on said headstock means and said tailstock means during operation of the machine tool.

4. A machine tool as set forth in claim 3 wherein said control means further includes means for selectively varying the relatively low holding force applied to the workpiece by said tailstock means.

5. A machine tool as set forth in claim 1 wherein said control means includes means for varying the speed at which said motor means moves said tailstock means relative to said bed.

6. A machine tool as set forth in claim 5 wherein said control means further includes means for varying the direction in which said motor means moves said tailstock means relative to said bed.

7. A machine tool comprising a bed, headstock means mounted adjacent to one end portion of said bed for engaging and rotating a workpiece, tailstock means movably mounted on said bed for engaging an end portion of the workpiece, an electric motor having a stall condition in which it is capable of producing a predetermined output torque, drive means operatively interconnecting said electric motor and said tailstock means for transmitting force from said electric motor to said tailstock means to effect movement of said tailstock means along said bed upon operation of said electric motor, and control means for effecting operation of said electric motor in the stall condition during operation of the machine tool to transmit a predetermined torque from said electric motor to said drive means to urge said tailstock means toward the workpiece with a predetermined force which is a function of the output torque of said electric motor in the stall condition.

8. A machine tool as set forth in claim 7 wherein said control means includes means for varying a voltage applied to said electric motor to thereby vary the output torque of said electric motor in the stall condition and the force urging said tailstock means toward the workpiece during operation of the machine tool.

9. A machine tool as set forth in claim 8 wherein said means for varying a voltage applied to said electric motor includes a transformer, circuit means for electrically connecting an output side of said transformer with said electric motor, and means for varying the voltage transmitted from the output side of said transformer to said electric circuit means.

10. A machine tool as set forth in claim 7 wherein said control means includes means for reversing the direction of operation of said electric motor to reverse the direction in which said drive means moves said tailstock means along said bed.

11. A machine tool comprising a bed, headstock means for engaging and rotating a workpiece, tailstock means movable along said bed into engagement with the workpiece, motor means for moving said tailstock means along said bed into engagement with the workpiece, said motor means having a first condition in which said motor means is effective to move said tailstock means relative to said bed and a second condition in which said motor means is ineffective to move said tailstock means relative to said bed and is effective to urge said tailstock means toward said headstock means to apply a predetermined force to the workpiece, said motor means including electric motor, and control means for effecting operation of said electric motor during operation of said motor means in the second condition to maintain a predetermined force on workpiece urging the workpiece toward said headstock means, said control means including means for varying the voltage applied to said said electric motor to vary the operating speed of said electric motor the speed at which said tailstock means is moved relative to said bed during operation of said motor means in the first condition and to vary the predetermined force applied to the workpiece between a relatively high setting force to provide for secure engagement of the workpiece by said tailstock means and a relatively low holding force to reduce the operating load on said headstock means and said tailstock means during operation of said motor means in the second condition.

12. A machine tool as set forth in claim 11 wherein said means for varying a voltage applied to said electric motor includes a transformer, circuit means for electrically connecting an output side of said transformer with said electric motor, and means for varying the voltage transmitted from the output side of said transformer to said electric circuit means.

13. A machine tool comprising a bed having longitudinally extending bedways, headstock means for engaging and rotating a workpiece, tailstock means movable along said bedways into engagement with the workpiece, said tailstock means including a base disposed in engagement with said bedways and center means mounted on said base for engaging a workpiece, drive means for moving said base and center means toward and away from said bedstock means along said bedways, motor means for activating said drive means to move said base and center means along said bedways to bring said center means into engagement with the workpiece, said motor means having a stalled condition in which said motor means is ineffective to activate said drive means to move said base and center means relative to said bedways and in which said motor means is effective to apply a force to said drive means and urge said base and center means toward said headstock means to apply a predetermined force to the workpiece, and control means for effecting operation of said motor means in the stalled condition during operation of said machine tool to urge said base and center means toward said headstock means and maintain the predetermined force on the workpiece, said motor means including an electric motor and said control means maintains said electric motor energized in a stall condition during operation of the machine tool so that the predetermined force applied to the workpiece is a function of the torque output of the electric motor in a stall condition.

14. A machine tool as set forth in claim 13 wherein said control means includes means for adjusting the magnitude of the force applied by said motor means to said drive means when said motor means is in the stalled condition to thereby adjust the predetermined force applied to the workpiece during operation of said machine tool.

* * * * *